United States Patent
Tomimatsu et al.

(10) Patent No.: US 12,307,830 B2
(45) Date of Patent: May 20, 2025

(54) VEHICLE COMMUNICATION SYSTEM

(71) Applicant: HONDA MOTOR CO., LTD., Tokyo (JP)

(72) Inventors: Shuji Tomimatsu, Tokyo (JP); Tomoya Kitano, Tokyo (JP); Tatsuroh Saitoh, Tokyo (JP); Takumi Nomura, Tokyo (JP); Sora Nishigaki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 230 days.

(21) Appl. No.: 18/076,737

(22) Filed: Dec. 7, 2022

(65) Prior Publication Data
US 2023/0196848 A1    Jun. 22, 2023

(30) Foreign Application Priority Data

Dec. 22, 2021 (JP) ................................ 2021-208253
Aug. 24, 2022 (JP) ................................ 2022-133180

(51) Int. Cl.
*G07C 5/00* (2006.01)
*H04L 12/40* (2006.01)

(52) U.S. Cl.
CPC .............. *G07C 5/008* (2013.01); *H04L 12/40* (2013.01); *H04L 2012/40273* (2013.01)

(58) Field of Classification Search
CPC ....... G07C 5/008; G07C 5/0808; H04L 12/40; H04L 2012/40273; H04L 12/12; H04L 2012/40215; H04L 12/40006; H04L 12/40013; H04L 12/40143
See application file for complete search history.

(56) References Cited

U.S. PATENT DOCUMENTS

| | | | |
|---|---|---|---|
| 2011/0093144 A1* | 4/2011 | Goodermuth | ..... H04L 12/40169 246/167 R |
| 2017/0237690 A1 | 8/2017 | Kawada | |
| 2018/0131538 A1* | 5/2018 | Ando | ................ H04L 12/40163 |
| 2020/0379941 A1 | 12/2020 | Okajima | |
| 2023/0362032 A1* | 11/2023 | Naka | ....................... H04L 12/46 |

(Continued)

FOREIGN PATENT DOCUMENTS

| | | | | |
|---|---|---|---|---|
| JP | 2016-032274 A | | 3/2016 | |
| JP | 2017124700 A | * | 7/2017 | .......... B60R 16/023 |
| JP | 2017-143449 A | | 8/2017 | |

(Continued)

OTHER PUBLICATIONS

Japanese Office Action from Corresponding Application No. JP 2022-133180 A, with English Translation, dated Mar. 12, 2024, 6 pages.

*Primary Examiner* — Nga X Nguyen
(74) *Attorney, Agent, or Firm* — Rankin, Hill & Clark LLP

(57) ABSTRACT

A vehicle communication system includes a relay device that relays communication and a first communication bus and a second communication bus that connect between the relay device and vehicle control ECUs, and the relay device and the vehicle control ECUs perform communication of control data relating to a control operation for a vehicle by using the first communication bus and perform communication of the control data and/or communication of non-control data by using the second communication bus.

4 Claims, 5 Drawing Sheets

(56) References Cited

U.S. PATENT DOCUMENTS

2024/0004634 A1* 1/2024 Adachi .................. H04L 12/28

FOREIGN PATENT DOCUMENTS

| JP | 2018-078396 A | 5/2018 |
| JP | 2020-195035 A | 12/2020 |
| JP | 2021-175140 A | 11/2021 |
| JP | 7279591 B2 | 5/2023 |

* cited by examiner

VEHICLE COMMUNICATION SYSTEM

INCORPORATION BY REFERENCE

The present application claims priority under 35 U.S.C. § 119 to Japanese Patent Application No. 2021-208253 filed on Dec. 22, 2021 and Japanese Patent Application No. 2022-133180 filed on Aug. 24, 2022. The content of the applications is incorporated herein by reference in its entirety.

BACKGROUND OF THE INVENTION

Field of the Invention

The present invention relates to a vehicle communication system that performs communication between a plurality of electronic control units mounted in a vehicle.

Description of the Related Art

Conventionally, a plurality of electronic control units (hereinafter, ECU) mounted in a vehicle have been connected by a communication bus to perform communication compliant with a standard such as CAN, for example, so that communication of control data required for control over a vehicle operation is performed. To such ECUs, in addition to the communication bus, a communication line for transmitting diagnosis data for performing a diagnosis on whether an operation of each ECU is normal or not is further connected. In general, a standard is provided for response times of an ECU to communication requests from a diagnosis device externally connected to a vehicle. By providing a communication line for transmitting diagnosis data as described above separately from the communication bus for transmission of control data, a response signal transmitted by an ECU to a response request from the diagnosis device can be received without delay in the diagnosis device.

On the other hand, with increases in complexity and variety of vehicle functionality such as ADAS and autonomous driving in recent years, the amounts of information communication between ECUs have been increased, and attempting redundant data communication between ECUs through connections between the ECUs via a plurality of communication buses has been proposed in order to improve reliability of control operations (see Japanese Patent Laid-Open No. 2021-175140, for example).

SUMMARY OF THE INVENTION

However, an increased number of communication lines (including a communication bus, the same is true hereinafter) that connects between ECUs increases the number and size of communication devices to be equipped in each of the ECUs, which may inconveniently increase cost and power consumption of the vehicle as a whole.

In view of such background, an object of the present invention is to achieve better communication of non-control data such as diagnosis data, without providing a special communication line for transmitting diagnosis data, and, at the same time, to attempt increases in the communication amounts and/or redundancy of control data communication required for control over vehicle operations.

The object above may reduce the number of communication lines in a vehicle for improvement of energy efficiency in inter-vehicle communication, which may contribute to achievement of SDGs through realization of an efficient and sustainable vehicle society (SDGs 7.3, 12.2 and so on).

One aspect of the present invention is a vehicle communication system including a relay device that relays data communication between a plurality of vehicle control ECUs mounted in a vehicle and two communication buses that connect between the relay device and each of the vehicle control ECUs, wherein the relay device and the vehicle control ECUs perform communication of control data relating to a control operation for the vehicle by using a first communication bus that is one of the two communication buses and perform communication of the control data and/or communication of non-control data excluding data relating to a control operation for the vehicle by using a second communication bus that is another one of the two communication buses.

According to another aspect of the present invention, data to be communicated between the relay device and the vehicle control ECUs is assigned a priority level, the relay device and the vehicle control ECUs communicate data to which a higher priority level is assigned in priority to other pieces of data, and the control data is assigned a higher priority level than that of the non-control data.

According to another aspect of the present invention, the relay device has a priority level management unit that manages assignment of a priority level to the non-control data, and while the vehicle stops, the priority level management unit assigns a higher priority level to the non-control data compared to a time when the vehicle is not stopped.

According to another aspect of the present invention, the relay device has a priority level management unit that manages assignment of a priority level to the non-control data, and the non-control data includes diagnosis data to be communicated between a vehicle diagnosis device connected to the relay device externally to the vehicle and the vehicle control ECUs, and when the vehicle diagnosis device is connected to the relay device, the priority level management unit assigns a higher priority level to the non-control data compared to a time when the vehicle diagnosis device is not connected.

According to another aspect of the present invention, a communication band of communication via the second communication bus to be performed between the relay device and the vehicle control ECUs is narrower than a communication band of communication via the first communication bus.

According to another aspect of the present invention, the relay device and the vehicle control ECUs includes a first communication management unit and a second communication management unit, respectively, that manage communication via the second communication bus, and the first communication management unit and second communication management unit perform communication of the non-control data via the second communication bus when there is not the control data to be transmitted via the second communication bus.

According to another aspect of the present invention, the relay device and the vehicle control ECUs includes a first communication management unit and a second communication management unit, respectively, that manage communication via the second communication bus, and the first communication management unit and second communication management unit does not perform communication of the non-control data via the second communication bus when there is the control data to be transmitted via the second communication bus.

According to the aspects of the present invention, better communication of non-control data such as diagnosis data is achieved, without providing a special communication line for transmitting diagnosis data, and, at the same time, increases in the communication amounts and redundancy of control data communication required for control over vehicle operations can be attempted.

DETAILED DESCRIPTION OF THE PREFERRED EMBODIMENTS

Embodiments of the present invention are described below with reference to drawings.

Figure 1:
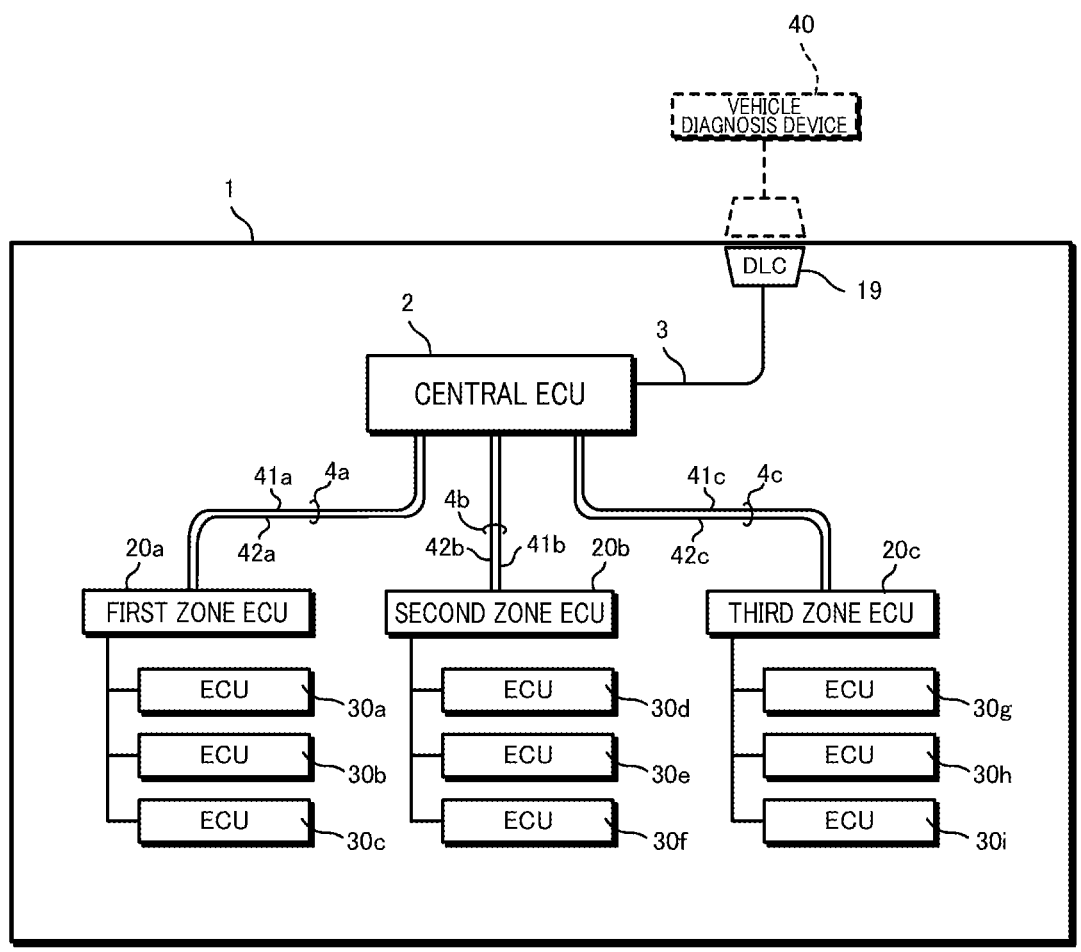
FIG. 1 is a configuration diagram of a vehicle-mounted control system that is a vehicle communication system according to one embodiment of the present invention.

FIG. 1 is a diagram showing a configuration of a vehicle-mounted control system 1 that is a vehicle communication system according to one embodiment of the present invention.

The control system 1 includes a central ECU 2 that performs general control and information processing in a vehicle. Hereinafter, a vehicle in which the control system 1 is mounted is called "the vehicle". The central ECU 2 is connected to a first communication line 3 and second communication lines 4a, 4b, and 4c and also realizes functionality of a gateway that manages exchange of communication data between those communication lines. The central ECU 2 is further connected to a wireless device (not shown) compliant with a communication standard for mobile communication systems and executes over the air (OTA) management. The OTA management includes a control that downloads an update program for a vehicle-mounted device provided in the vehicle from a server external to the vehicle and applies the update program to the vehicle-mounted device.

A data link connector (DLC) 19 is provided in the first communication line 3. A vehicle diagnosis device 40, for example, is connected to the DLC 19 externally to the vehicle.

A first zone ECU 20a, a second zone ECU 20b, and a third zone ECU 20c are connected to the second communication lines 4a, 4b, and 4c, respectively. ECUs 30a, 30b, and 30c are connected to the first zone ECU 20a, and ECUs 30d, 30e, and 30f are connected to the second zone ECU 20b. Also, ECUs 30g, 30h, and 30i are connected to the third zone ECU 20c.

Hereinafter, the first zone ECU 20a, second zone ECU 20b, and third zone ECU 20c are collectively called "zone ECU 20" and the ECUs 30a, 30b, 30c, 30d, 30e, 30f, 30g, 30h, and 30i are collectively called "ECU 30".

The ECU 30 may include, for example, a map positioning unit (MPU), a multi view camera (MVC)-ECU, a parking support (PKS)-ECU and/or advanced driver-assistance system (ADAS)-ECU, and ECUs that control operations of other various devices and sensors equipped in the vehicle. Such devices and sensors may include a driving motor for causing the vehicle to run, steering devices such as an accelerator and a brake, a vehicle stability assist (VSA), a battery, a lighting such as a head lamp, a window motor that drives a door window, an actuator that drives a door lock mechanism, a door lock sensor, a door open/close sensor, a temperature sensor, a vehicle exterior camera, a vehicle interior camera, and so on.

To each of the zone ECUs 20, a plurality of ECUs 30 arranged within the same section in a vehicle body space of the vehicle or a plurality of ECUs 30 that control operations of devices and sensors arranged in the same section are connected.

It should be noted that, in addition to the zone ECU 20, other control devices and apparatuses are connectable to the central ECU 2. Such control devices and apparatuses may include an infotainment control box (ICB), a speaker, and a microphone, and a meter panel, a steering switch, a GNSS sensor, a touch panel, and so on.

Here, the control system 1 and the central ECU 2 correspond to a vehicle communication system and a relay device, respectively, of the present disclosure. Also, the first zone ECU 20a, the second zone ECU 20b, and the third zone ECU 20c correspond to a plurality of vehicle control ECUs mounted in a vehicle according to the present disclosure.

According to this embodiment, each of the second communication lines 4a, 4b and 4c that connect between the central ECU 2 being the relay device and the first zone ECU 20a, second zone ECU 20b and third zone ECU 20c being the vehicle control ECUs is configured by two communication buses. More specifically, the second communication line 4a is configured by a first communication bus 41a and a second communication bus 42a. Similarly, the second communication line 4b is configured by a first communication bus 41b and a second communication bus 42b, and the second communication line 4c is configured by a first communication bus 41c and a second communication bus 42c.

Hereinafter, the second communication lines 4a, 4b and 4c are collectively called a second communication line 4. Also, the first communication buses 41a, 41b and 41c are collectively called a first communication bus 41, and the second communication buses 42a, 42b, 42c are collectively called a second communication bus 42. According to this embodiment, the first communication bus 41 and the second communication bus 42 are CAN buses for performing communications compliant with CAN communication standard.

A configuration and communication operations of the control system 1 that is a vehicle communication system are described below with reference to the second zone ECU 20b as one example of the vehicle control ECUs. However, the following communication operations between the second zone ECU 20b and the central ECU 2 may be performed in the same manner between the other vehicle control ECUs and the central ECU 2.

1. Communication Operations of Control System

In the control system 1 according to this embodiment, communication between the second zone ECU 20b (vehicle control ECU) and the central ECU 2 (relay device) is performed as follows.

Communication data to be communicated between the central ECU 2 and the second zone ECU 20b includes control data for transmitting data relating to a control operation of the vehicle and non-control data for transmitting data excluding the data relating to a control operation of the vehicle.

The central ECU 2 and the second zone ECU 20b perform communication of control data by using the first communication bus 41b of the second communication line 4b and perform communication of the control data and communication of non-control data by using the second communication bus 42b. Thus, in the control system 1, better communication of non-control data such as diagnosis data is achieved, without providing a special communication line for transmitting diagnosis data, and, at the same time, increases in the redundancy of control data communication required for control over vehicle operations and the allowable communication amounts can be attempted. According to this embodiment, non-control data includes diagnosis data to be communicated between the vehicle diagnosis device 40 connected to the central ECU 2 externally to the vehicle and the vehicle control ECU such as the second zone ECU 20b and information relating to OTA and an update program for the vehicle control ECU.

Communication data is assigned a priority level, and the central ECU 2 and the second zone ECU 20b communicate communication data to which a higher priority level is assigned in priority to other pieces of communication data. According to this embodiment, the communication data is configured by a data packet that is configured in accordance with CAN communication standard, and the priority level is indicated by an ID included in each communication data. The ID may further include an identification code indicating whether the communication data is non-control data or control data and a type code indicating a content type of data included in the communication data.

According to this embodiment, particularly, control data is assigned a higher priority level than non-control data. Thus, a decrease of the communication speed of control data due to occurrence of non-control data can be prevented, and better responsibility of a vehicle control operation to be performed by a plurality of vehicle control ECUs in collaboration may be acquired.

The central ECU 2 being a relay device manages assignment of a priority level to non-control data. According to this embodiment, while the vehicle stops, the central ECU 2 assigns a higher priority level to non-control data compared to a time when the vehicle is not stopped. Thus, during a period when the vehicle remains stopped and swiftness of vehicle control is not required, the communication speed of pieces of non-control data can be increased so that, for example, an update program for the vehicle control ECU can be quickly executed.

Also, when the vehicle diagnosis device 40 is connected externally to the vehicle, the central ECU 2 assigns a higher priority level to non-control data compared to a time when the vehicle diagnosis device 40 is not connected. Since connecting the vehicle diagnosis device 40 externally to the vehicle is limited to a time when the vehicle remains stopped, the swiftness of a diagnosis including communication of diagnosis data can be provided without affecting the swiftness of vehicle control while driving. For example, according to this configuration, it is easy to have the response time from a time when a data response from the vehicle diagnosis device 40 to the vehicle control ECU is instructed to a time when the vehicle diagnosis device 40 receives the response from the vehicle control ECU within a range provided by a predetermined public standard.

Here, a communication band of communication via the second communication bus 42b to be performed between the central ECU 2 and the second zone ECU 20b can be narrower than a communication band of communication via the first communication bus 41b. Since it thus reduces the communication band of the second communication bus 42b that performs communication of non-control data, which allows a lower communication speed than that for control data, the cost of the communication device using the second communication bus 42b can be reduced without affecting traffic of communication data.

The central ECU 2 and the second zone ECU 20b perform communication of non-control data via the second communication bus 42b when there is no control data to be transmitted via the second communication bus 42b. Thus, a decrease of the communication speed of control data due to occurrence of non-control data can be prevented on the second communication bus 42b, and better responsibility of a vehicle control operation to be performed by a plurality of vehicle control ECUs in collaboration may be acquired.

The central ECU 2 and the second zone ECU 20b do not perform communication of non-control data via the second communication bus 42b when there is control data to be transmitted via the second communication bus 42b. Thus, when a need arises for performing communication of control data while non-control data is being communicated on the second communication bus 42b, the communication of the non-control data is suspended so that the communication speed of the control data can be kept high.

It should be noted that the central ECU 2 and the second zone ECU 20b may be configured such that control data and non-control data are transmitted periodically via the second communication bus 42b. In that case, when communication data to be communicated is control data, the communication is performed by increasing the priority level of the control data so that the communication speed of the control data can be kept high and better responsibility can be acquired. On the other hand, when non-control data is to be communicated, the priority level of the non-control data may be increased.

2. Configuration of Vehicle Control ECU

A configuration of the vehicle control ECU is described below with reference to the second zone ECU 20b as an example. Although each of the vehicle control ECUs performs vehicle control operations that are mutually different in details, the other vehicle control ECUs also have the following configuration relating to a communication function in the second zone ECU 20b. Here, the "configuration relating to a communication function" includes a control unit 57 in the configuration of the second zone ECU 20b in FIG. 2 and components excluding a control program 54.

Figure 2:
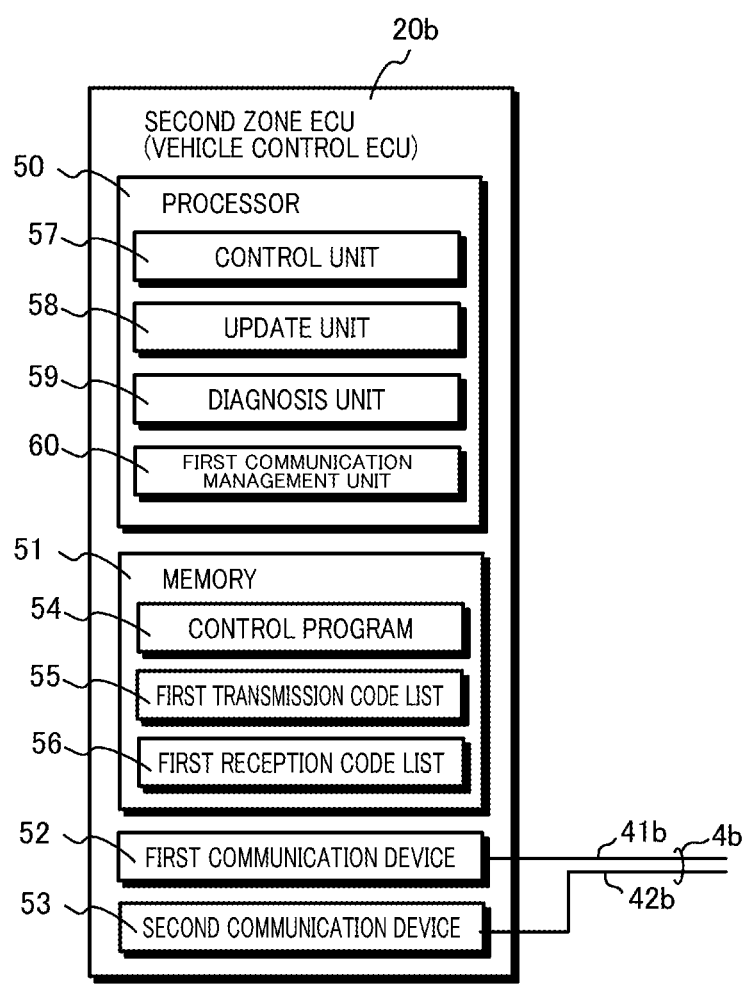
FIG. 2 is a diagram showing a configuration of a second zone ECU that is an example of a vehicle control ECU.

FIG. 2 is a diagram showing a configuration of the second zone ECU 20b.

The second zone ECU 20b includes a processor 50, a memory 51, a first communication device 52, and a second communication device 53.

Each of the first communication device 52 and the second communication device 53 has a CAN transceiver for communicating with the central ECU 2 via the first communication bus 41b and the second communication bus 42b that are CAN communication buses included in the second communication line 4b. Each of the first communication device 52 and the second communication device 53 receives communication data for transmission from a first communication management unit 60, which will be described below. Each of the first communication device 52 and the second communication device 53 saves the communication data received from the first communication management unit 60 in a transmit buffer (not shown) that is a temporary storage for transmission data in accordance with a prior art and sends out those pieces of communication data to the first communication bus 41*b* and the second communication bus 42*b* in decreasing order of priority level indicated by the ID of each communication data.

Also, each of the first communication device 52 and the second communication device 53 receives communication data from the first communication bus 41*b* and the second communication bus 42*b* and transmits the received communication data to the first communication management unit 60.

The first communication device 52 is used for communication of control data, and the second communication device 53 is used for communication of the control data and non-control data. Also, as the second communication device 53, a communication device with a narrower communication band than that of the first communication device 52 is used.

The memory 51 is configured by, for example, a volatile and/or nonvolatile semiconductor memory. The memory 51 stores the control program 54 to be executed in the processor 50. The memory 51 further stores a first transmission code list 55 and a first reception code list 56.

The first transmission code list 55 is a list having, in association, a type code indicating a content type of data for transmission generated by the processor 50, a priority level to be given to the data for transmission, and an identification code indicating which of control data and non-control data the communication data including the data for transmission corresponds to. The first reception code list 56 is a list having, in association, a type code of communication data to be received as the second zone ECU 20*b* and information indicating the destination (that is, one of a control unit 57, an update unit 58 and a diagnosis unit 59, which will be described below) of the communication data.

The processor 50 is a computer included in the second zone ECU 20*b* and is configured by, for example, one or more central processing units (CPUs). The processor 50 may be configured to have a read only memory (ROM) in which a program is written, a random access memory (RAM) for temporarily storing data, and so on.

The processor 50 includes, as functional elements or functional units, the control unit 57, the update unit 58, the diagnosis unit 59, and the first communication management unit 60. These functional elements included in the processor 50 are realized by execution by the processor 50 being a computer, for example, of the control program 54 stored in the memory 51. It should be noted that the control program 54 can be prestored in an arbitrary computer-readable storage medium such as an optical disk, a magnetic disk, a flash memory or the like. The control program 54 and an update program therefor are received through the central ECU 2 having an OTA function from a server device (not shown) external to the vehicle and communicatively connected to the vehicle and are downloaded to the memory 51.

The control unit 57 controls, for example, a running operation of the vehicle. For example, the control unit 57 controls a power conduction operation from a battery included in the vehicle to a motor for running and controls operations such as braking for acquiring running stability, based on a driver's operation on a steering device connected to the second zone ECU 20*b*.

The control unit 57 further operates in conjunction with, for example, the first zone ECU 20*a* that performs autonomous driving control and performs vehicle control for autonomous running, parking assist operation, and so on.

For those operations in conjunction, the control unit 57 exchanges pieces of control data with other vehicle control ECUs such as the first zone ECU 20*a* through the first communication device 52 and/or the second communication device 53.

More specifically, the control unit 57 generates data for transmission including data relating to control to be transmitted. The control unit 57 then transmits the generated data for transmission to the first communication management unit 60 along with the type code indicating a content type of the data for transmission. The first communication management unit 60 generates communication data including data relating to control from the data for transmission and transmits the generated communication data to another vehicle control ECU, as will be described below.

The control unit 57 further receives communication data including data relating to control transmitted from another vehicle control ECU through the first communication device 52 and/or second communication device 53 and the first communication management unit 60. Here, the communication data including data relating to control is an example of control data.

When the update unit 58 receives communication data including an ECU information request from the central ECU 2, the update unit 58 determines whether a download target indicated by target information included in the ECU information request is the second zone ECU 20*b* or not. Then, if the download target is the second zone ECU 20*b*, data for transmission is generated which includes ECU information including a model number and hardware version of the second zone ECU 20*b* and a software version of the currently used control program 54. The update unit 58 transmits the generated data for transmission to the first communication management unit 60 along with the type code indicating a content type of the data for transmission (that is, the type code indicating ECU information). The first communication management unit 60 generates communication data including ECU information from the data for transmission and transmits the generated communication data to the central ECU 2.

The update unit 58 further receives communication data including program code of the new control program 54 that has been updated from the central ECU 2 through the first communication management unit 60. The update unit 58 stores the received program code in the memory 51. Here, the communication data including the ECU information request, the communication data including ECU information, and the communication data including program code are pieces of non-control data.

The diagnosis unit 59 receives communication data including a diagnosis data request through the central ECU 2 from the vehicle diagnosis device 40 connected to the vehicle externally to the vehicle via the DLC 19. In response to the request, the diagnosis unit 59 generates data for transmission including the diagnosis data requested by the received diagnosis data request. The diagnosis unit 59 then transmits the generated data for transmission to the first communication management unit 60 along with the type code indicating a content type of the data for transmission. The first communication management unit 60 generates communication data including diagnosis data from the data for transmission and transmits the generated communication data through the central ECU 2 to the vehicle diagnosis device. Here, the communication data including a diagnosis data request and the communication data including diagnosis data as described above are pieces of non-control data.

The first communication management unit 60 manages communication via the first communication bus 41b and the second communication bus 42b in the second zone ECU 20b. More specifically, when the first communication device 52 or the second communication device 53 receives communication data from the first communication bus 41b or the second communication bus 42b, respectively, the first communication management unit 60 extracts the type code indicating a content type from the ID of the communication data. The first communication management unit 60 refers to the first reception code list 56 stored in the memory 51 and, if the extracted type code is not included in the first reception code list 56, abandons the received communication data.

On the other hand, if the extracted type code is included in the first reception code list 56, the first communication management unit 60 transmits the received communication data to the control unit 57, the update unit 58, or the diagnosis unit 59 in accordance with the destination corresponding to the type code indicated in the first reception code list 56.

When the first communication management unit 60 receives data for transmission from the control unit 57, the update unit 58, or the diagnosis unit 59, the first communication management unit 60 refers to the first transmission code list 55 and generates an ID including the type code given to the data for transmission and the priority level and identification code associated with the type code. Then, the first communication management unit 60 generates communication data including the received data for transmission and the generated ID.

The first communication management unit 60 further determines whether the communication data is control data or non-control data from the identification code of the ID of the generated communication data. If the generated communication data is control data, the first communication management unit 60 transmits the communication data to the first communication bus 41b or the second communication bus 42b through the first communication device 52 or the second communication device 53, respectively.

More specifically, the first communication management unit 60 determines an allowance for the transmission operation in the first communication device 52, and if the generated communication data is control data and there is an allowance for the transmission operation in the first communication device 52, transmits the generated communication data to the first communication device 52. On the other hand, if the generated communication data is control data and if there is no allowance for a transmission operation in the first communication device 52, the first communication management unit 60 transmits the generated communication data to the second communication device 53.

As described above, each of the first communication device 52 and the second communication device 53 sends out those pieces of communication data to the first communication bus 41b and the second communication bus 42b in decreasing order of the priority levels indicated by the IDs in pieces of the communication data.

Here, the allowance for a transmission operation in the first communication device 52 can be determined from an average retention time of pieces of communication data within the latest predetermined period of time in, for example, the transmit buffer included in the first communication device 52 (that is, an average time period from a time when communication data is saved in the transmit buffer to a time when the communication data is transmitted to the first communication bus 41b). The first communication management unit 60 compares the average retention time in the first communication device 52, for example, with a predetermined threshold and, if the average retention time is greater than or equal to the threshold, determines that there is no allowance for a transmission operation in the corresponding first communication device 52.

On the other hand, if the generated communication data is non-control data, the first communication management unit 60 transmits the communication data to the second communication bus 42b through the second communication device 53. In this case, if there is no control data to be transmitted via the second communication bus 42b, the first communication management unit 60 can perform communication of non-control data via the second communication bus 42b. More specifically, if no communication data being control data is saved within the transmit buffer in the second communication device 53 connected to the second communication bus 42b, the first communication management unit 60 transmits communication data being non-control data to the second communication device 53.

Further, the first communication management unit 60 does not perform communication of non-control data via the second communication bus 42b when there is control data to be transmitted via the second communication bus 42b. More specifically, if communication data being control data is saved within the transmit buffer in the second communication device 53 connected to the second communication bus 42b or if control data is received from the second communication bus 42b by the second communication device 53 within the latest predetermined period of time, the first communication management unit 60 does not transmit communication data being non-control data to the second communication device 53. Also, when transmitting communication data being control data to the second communication device 53 if communication data being non-control data is saved within the transmit buffer in the second communication device 53, the first communication management unit 60 may instruct the second communication device 53 to abandon (that is, delete) the communication data being non-control data within the transmit buffer. The first communication management unit 60 may temporarily save non-control data and can retry the transmission of the abandoned non-control data afterwards.

In the aforementioned case, the average retention time can be measured by the first communication device 52, and the measurement result can be transmitted to the first communication management unit 60. The second communication device 53 can further transmit an ID list of pieces of communication data saved within the transmit buffer to the first communication management unit 60 in response to a request from the first communication management unit 60. Thus, based on the ID list, the first communication management unit 60 can determine whether communication data being non-control data and/or communication data being control data is saved within the transmit buffer in the second communication device 53 or not.

Further, in response to reception of communication data including a priority level change request from the central ECU 2, the first communication management unit 60 increases the priority levels of pieces of the non-control data listed on the first transmission code list 55 by a predetermined level. Further, in response to reception of communication data including an initialization request from the central ECU 2, the first communication management unit 60 sets the priority levels of pieces of the non-control data listed on the first transmission code list 55 to a predetermined initial value.

3. Configuration of Relay Device

Next, a configuration of the central ECU 2 being a relay device is described.

The central ECU 2 relays data communication between a plurality of vehicle control ECUs mounted in the vehicle.

Figure 3:
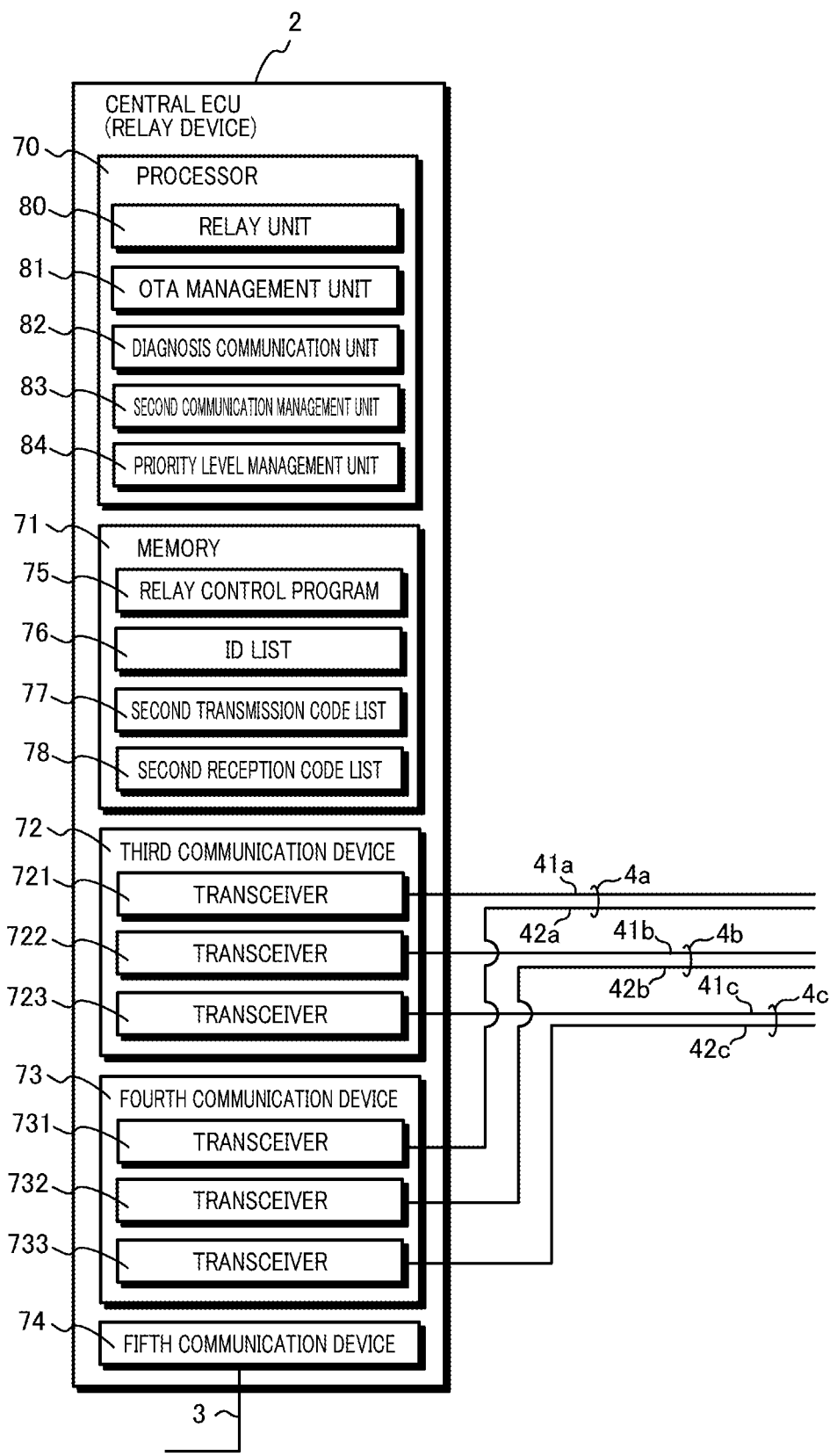
FIG. 3 is a diagram showing a configuration of a central ECU that is a relay device.

FIG. 3 is a diagram showing a configuration of the central ECU 2. The central ECU 2 includes a processor 70, a memory 71, a third communication device 72, a fourth communication device 73, and a fifth communication device 74. The third communication device 72 has three transceivers 721, 722 and 723 which perform communications via each of three first communication buses 41*a*, 41*b* and 41*c*, respectively. Further, the fourth communication device 73 has three transceivers 731, 732 and 733 which perform communications via each of three second communication buses 42*a*, 42*b* and 42*c*. These transceivers 721, 722 and 723 and 731, 732 and 733 are CAN transceivers which perform CAN communications, for example.

Each of the transceivers 721, 722 and 723 in the third communication device 72 and each of the transceivers 731, 732 and 733 in the fourth communication device 73 saves communication data for transmission received from a second communication management unit 83, which will be described below, in a transmit buffer (not shown) being a temporary storage for transmission data in the transceiver in accordance with a prior art. Then, these transceivers send out those pieces of communication data to the first communication bus 41 and the second communication bus 42 in decreasing order of priority level indicated by each of the IDs in pieces of the communication data.

The third communication device 72 is used for communication of control data, and the fourth communication device 73 is used for communication of the control data and non-control data. Also, as the fourth communication device 73, a communication device with a narrower communication band than that of the third communication device 72 may be used.

The memory 71 is, for example, a volatile and/or non-volatile semiconductor memory. The memory 71 stores a relay control program 75 to be executed in the processor 70. The memory 71 further stores an ID list 76. The ID list 76 is a list of IDs of pieces of communication data to be communicated via the first communication bus 41 and the second communication bus 42.

The memory 71 further stores a second transmission code list 77 and a second reception code list 78. The second transmission code list 77 is a list having, in association, a type code indicating a content type of pieces of data for transmission generated by an OTA management unit 81, a diagnosis communication unit 82, and a priority level management unit 84 in the processor 70, which will be described below, a priority level to be given to the data for transmission, and an identification code indicating which of control data and non-control data the communication data including the data for transmission corresponds to. Further, the second reception code list 78 is a list having, in association, a type code of communication data to be received as the central ECU 2 and information indicating a destination (that is, the OTA management unit 81 or the diagnosis communication unit 82, which will be described below) of the communication data.

The processor 70 is a computer included in the central ECU 2 and is configured by, for example, one or more CPUs. The processor 70 may be configured to have a ROM in which a program is written, a RAM for temporarily storing data, and so on.

The processor 70 includes, as functional elements or functional units, the relay unit 80, the OTA management unit 81, the diagnosis communication unit 82, the second communication management unit 83, and the priority level management unit 84. These functional elements included in the processor 70 are realized by execution, by the processor 70 being a computer, for example, of the relay control program 75 stored in the memory 71. It should be noted that the relay control program 75 can be prestored in an arbitrary computer-readable storage medium such as an optical disk, a magnetic disk, a flash memory or the like. Further, the relay control program 75 and an update program therefor may be downloaded from a server device communicatively connected to the vehicle to the memory 71.

The relay unit 80 relays data communication between a plurality of vehicle control ECUs. More specifically, the relay unit 80 receives, from the second communication management unit 83, communication data received from one of the second communication lines 4*a*, 4*b* and 4*c* through the third communication device 72 or the fourth communication device 73, along with reception line information indicating which second communication line of the second communication lines 4*a*, 4*b* and 4*c* the communication data has been received from. The relay unit 80 compares the ID included in the received communication data with the IDs of pieces of the valid communication data indicated by the ID list 76. Then, if the ID of the received communication data does not match any of IDs of pieces of valid communication data, the relay unit 80 abandons the received communication data.

On the other hand, if the ID of the received communication data matches one of IDs of pieces of valid communication data, the relay unit 80 transmits the received communication data to the second communication management unit 83 along with the reception line information. The second communication management unit 83 sends out the received communication data to the second communication line, excluding the second communication line indicated by the reception line information, of the second communication lines 4*a*, 4*b* and 4*c*.

The OTA management unit 81 downloads, to the corresponding vehicle control ECU, an update program for a control program for the vehicle control ECU (such as the control program 54 for the second zone ECU 20*b*, for example) from a server device (not shown) communicatively connected to the vehicle through a TCU 12.

More specifically, the OTA management unit 81 receives a download instruction for an update program and the update program from the server device through the TCU 12 and stores them in the memory 71. The download instruction includes application information indicating an application requirement for the update program and target information designating a vehicle control ECU that is a target of the download.

In response to reception of the download instruction, the OTA management unit 81 generates data for transmission including an ECU information request including the target information. The OTA management unit 81 transmits the generated data for transmission to the second communication management unit 83 along with the type code indicating a content type of the data for transmission. The second communication management unit 83 generates communication data including an ECU information request from the data for transmission and transmits the generated communication data to the second communication lines 4*a*, 4*b*, and 4*c*.

The OTA management unit 81 receives communication data including ECU information from the vehicle control ECU. Based on the model number, hardware version and software version of the vehicle control ECU indicated by the ECU information included in the received communication data and the application information for the download instruction received from the server device, the OTA management unit 81 determines whether the update program should be downloaded to the vehicle control ECU or not.

Then, if the OTA management unit 81 determines that the ECU information meets the application information and that the update program should be downloaded to the vehicle control ECU, the OTA management unit 81 generates data for transmission including the update program received from the server device and stored in the memory 71. The OTA management unit 81 transmits the generated data for transmission to the second communication management unit 83 along with the type code indicating a content type of the data for transmission.

The second communication management unit 83 generates communication data including the update program from the data for transmission and transmits the generated communication data to the corresponding vehicle control ECU via the second communication line 4. It should be noted that the update program can be divided into a plurality of pieces of communication data and be transmitted in accordance with a prior art.

In response to reception of a diagnosis data request from the vehicle diagnosis device 40 connected to the DLC 19, the diagnosis communication unit 82 generates data for transmission including the received diagnosis data request. The diagnosis communication unit 82 transmits the generated data for transmission to the second communication management unit 83 along with the type code indicating a content type of the data for transmission. The second communication management unit 83 generates communication data including the diagnosis data request from the data for transmission and transmits the generated communication data to the second communication lines 4a, 4b, and 4c.

The diagnosis communication unit 82 receives communication data including diagnosis data from the vehicle control ECU and transmits the diagnosis data included in the received communication data to the vehicle diagnosis device 40 via the first communication line 3 through the fifth communication device 74.

The second communication management unit 83 manages communications via the first communication bus 41 and the second communication bus 42 in the central ECU 2. More specifically, the second communication management unit 83 transmits, to the relay unit 80, communication data received from one of the second communication lines 4a, 4b and 4c through the third communication device 72 or the fourth communication device 73, along with reception line information indicating which second communication line the communication data is received from.

When the second communication management unit 83 receives communication data from one of the second communication lines 4a, 4b and 4c through the third communication device 72 or the fourth communication device 73, the second communication management unit 83 further extracts the type code indicating a content type from the ID of the communication data. The second communication management unit 83 refers to the second reception code list 78 stored in the memory 71, and, if the extracted type code is included in the second reception code list 78, the second communication management unit 83 transmits the received communication data to the OTA management unit 81 or the diagnosis communication unit 82 in accordance with the destination corresponding to the type code indicated in the second reception code list 78.

When the second communication management unit 83 receives the data for transmission from the OTA management unit 81 or the diagnosis communication unit 82, the second communication management unit 83 further refers to the second transmission code list 77 and generates an ID including the type code given to the data for transmission and the priority level and identification code associated with the type code. Then, the second communication management unit 83 generates communication data including the received data for transmission and the generated ID.

The second communication management unit 83 further determines whether the generated communication data is control data or non-control data from the identification code included in the ID of the generated communication data. If the generated communication data is control data, the second communication management unit 83 transmits the communication data to the first communication bus 41 or the second communication bus 42 through the third communication device 72 or the fourth communication device 73, respectively. Further, if the generated communication data is non-control data, the second communication management unit 83 transmits the communication data to the second communication bus 42 through the fourth communication device 73.

Further, when the second communication management unit 83 receives the received communication data and the reception line information from the relay unit 80, the second communication management unit 83 determines whether the communication data is control data or non-control data from the ID included in the received communication data. Then, if the received communication data is control data, the second communication management unit 83 transmits the communication data to the first communication bus 41 or the second communication bus 42 of the second communication line 4 excluding the second communication line 4 indicated by the reception line information through the third communication device 72 or the fourth communication device 73. On the other hand, if the received communication data is non-control data, the second communication management unit 83 transmits the communication data to the second communication bus 42 of the second communication line 4 excluding the second communication line 4 indicated by the reception line information through the fourth communication device 73.

More specifically, the second communication management unit 83 determines an allowance for a transmission operation for each of the three transceivers 721, 722 and 723 of the third communication device 72 connected to the second communication lines 4a, 4b and 4c, respectively. Then, if the communication data to be transmitted (that is, the generated communication data or the communication data received from the relay unit 80) is control data and if there is an allowance for a transmission operation in all of the transceivers 721, 722 and 723, the second communication management unit 83 transmits the communication data to be transmitted to the three transceivers 721, 722 and 723 in the third communication device 72.

On the other hand, if the communication data to be transmitted is control data and there is no allowance for a transmission operation in one of the transceivers 721, 722 and 723, the second communication management unit 83 transmits the communication data to be transmitted to the transceiver 731, 732 or 733 of the fourth communication device 73 connected to the same second communication line as that of the second communication line 4a, 4b or 4c connected to the transceiver, instead of the transceiver having no allowance for a transmission operation. In other words, if, for example, there is not allowance for a transmission operation in the transceiver 721 connected to the first communication bus 41*a* of the second communication line 4*a*, the second communication management unit 83 transmits the communication data to be transmitted to the transceiver 731 connected to the second communication bus 42*a* of the same second communication line 4*a*.

It should be noted that, in the aforementioned case, if the communication data to be transmitted is communication data to be relayed, which is received from the relay unit 80, the second communication management unit 83 excludes transceiver 721, 722 or 723 and transceiver 731, 732 or 733 connected to the second communication line 4*a*, 4*b* or 4*c* indicated by the reception line information on the communication data from the target of the determination of an allowance and the destination of the communication data to be transmitted.

In other words, if, for example, the reception line information indicates the second communication line 4*b*, the second communication management unit 83 excludes the transceiver 722 connected to the first communication bus 41*b* of the second communication line 4*b* from the target of the determination of an allowance for a transmission operation and excludes the transceivers 722 and 732 respectively connected to the first communication bus 41*b* and second communication bus 42*b* of the second communication line 4*b* from the destination of the communication data to be relayed.

Here, the allowance for a transmission operation of the transceivers 721, 722 and 723 and the transceivers 731, 732 and 733 can be determined from an average retention time of pieces of communication data within the latest predetermined period of time in the transmit buffer included in each of the transceivers. The second communication management unit 83 compares, for example, the average retention time in each of the transceivers with a predetermined threshold and, if the average retention time is greater than or equal to the threshold, determines that there is no allowance for a transmission operation in the corresponding transceiver.

Further, on the other hand, if the communication data to be transmitted is non-control data, the second communication management unit 83 transmits the communication data to the second communication bus 42 of each of the second communication lines 4*a*, 4*b* and 4*c* through the transceivers 731, 732 and 733 of the fourth communication device 73. In this case, if there is no control data to be transmitted via the second communication bus 42 for each of the second communication lines 4*a*, 4*b* and 4*c*, the second communication management unit 83 can perform communication of non-control data via the second communication bus 42. More specifically, if no communication data being control data is saved within the transmit buffer in the transceivers 731, 732 and 733 connected to the second communication bus 42 for each of the second communication lines 4*a*, 4*b* and 4*c*, the second communication management unit 83 transmits communication data being non-control data to the transceivers 731, 732 and 733.

Further, the second communication management unit 83 does not perform communication of non-control data via the second communication bus 42 when it is determined that there is control data to be transmitted via the second communication bus 42 for each of the second communication lines 4*a*, 4*b* and 4*c*. More specifically, the second communication management unit 83 determines whether or not communication data being control data is saved within the transmit buffer in the transceiver 731, 732 or 733 connected to the second communication bus 42 for each of the second communication lines 4*a*, 4*b* and 4*c*, and, if control data is saved within the transmit buffer in one of those transceivers, does not transmit communication data being non-control data to the transceiver.

Further, the second communication management unit 83 determines whether or not control data has been received from the second communication bus 42 by the transceiver 731, 732 or 733 within the latest predetermined period of time, and, if control data has been received within the latest predetermined period of time by one of those transceivers, does not transmit communication data being non-control data to the transceiver.

Also, when transmitting communication data being a control data to the transceiver if communication data being non-control data is saved within the transmit buffer in one of the transceivers 731, 732 and 733 connected to the second communication bus 42, the second communication management unit 83 may instruct the transceiver to abandon communication data being non-control data within the transmit buffer in the transceiver. The second communication management unit 83 temporarily saves non-control data and can retry the transmission of the abandoned non-control data afterwards.

In the aforementioned case, the average retention time in each of the transceivers 721, 722 and 723 can be measured by the third communication device 72, and the measurement result can be transmitted to the second communication management unit 83. The fourth communication device 73 can further transmit an ID list of communication data saved within the transmit buffer in each of the transceivers 731, 732 and 733 to the second communication management unit 83 in response to a request from the second communication management unit 83. Thus, based on the ID list, the second communication management unit 83 can determine whether communication data being non-control data and/or communication data being control data is saved within the transmit buffers in the transceivers 731, 732 and 733 or not.

The priority level management unit 84 manages assignment of a priority level to non-control data. According to this embodiment, while the vehicle stops, the priority level management unit 84 assigns a higher priority level to non-control data compared to a time when the vehicle is not stopped. More specifically, the priority level management unit 84 generates data for transmission including a priority level change instruction when the vehicle stops. Then, the priority level management unit 84 transmits the generated data for transmission to the second communication management unit 83 along with the type code indicating a content type of the data for transmission. The second communication management unit 83 generates communication data including a priority level change instruction from the data for transmission and transmits the generated communication data to all of the second communication lines 4. The communication data including the priority level change instruction is non-control data. The vehicle control ECU, such as the second zone ECU 20*b*, for example, having received the communication data including a priority level change instruction increases, by a predetermined level, the priority levels of pieces of the non-control data listed on the first transmission code list 55 through the first communication management unit 60, as described above.

Further, when the vehicle stops, the priority level management unit 84 increases the priority levels of pieces of the non-control data listed on the second transmission code list 77 saved in the memory 71 by a predetermined level. When the vehicle stops, the priority level management unit 84 further changes the ID list 76 saved in the memory 71 so as to match the priority levels of pieces of the non-control data changed in the vehicle control ECUs in accordance with the priority level change instruction.

When the vehicle starts running, the priority level management unit 84 further sets the priority levels of pieces of the non-control data to an initial value. More specifically, the priority level management unit 84 generates data for transmission including an initialization instruction when the vehicle starts running. Then, the priority level management unit 84 transmits the generated data for transmission to the second communication management unit 83 along with the type code indicating a content type of the data for transmission. The second communication management unit 83 generates communication data including an initialization instruction from the data for transmission and transmits the generated communication data to the second communication lines 4. The communication data including the initialization instruction is non-control data. The vehicle control ECU, such as the second zone ECU 20b, for example, having received the communication data including the initialization instruction sets the priority levels of pieces of the non-control data listed on the first transmission code list 55 to a predetermined initial value through the first communication management unit 60.

Further, when the vehicle starts running, the priority level management unit 84 sets the priority levels of pieces of the non-control data listed on the second transmission code list 77 saved in the memory 71 to a predetermined initial value. When the vehicle starts running, the priority level management unit 84 further changes the ID list 76 saved in the memory 71 so as to match the priority levels of pieces of the non-control data having set to the initial value in the vehicle control ECUs in accordance with the initialization instruction.

In the aforementioned case, the priority level management unit 84 can determine whether the vehicle is stopped or not and whether the vehicle has started running or not based on the vehicle speed detected by a vehicle speed sensor (not shown) equipped in the vehicle.

Also, when the vehicle diagnosis device 40 is connected to the central ECU 2 through the DLC 19, the priority level management unit 84 assigns a higher priority level to non-control data compared to a time when the vehicle diagnosis device 40 is not connected. When the vehicle diagnosis device 40 is disconnected from the DLC 19, the priority level management unit 84 further sets the priority levels of pieces of the non-control data to an initial value. Here, the changing of the priority levels and the setting to the initial value may be performed in the same manner as described above. In accordance with the changing of the priority levels and the setting to the initial value, the priority level management unit 84 further changes the priority levels of or sets to the initial value pieces of the non-control data listed on the second transmission code list 77 saved in the memory 71 and changes the ID list 76 saved in the memory 71 so as to match the priority levels of pieces of the non-control data changed or set to the initial value in the vehicle control ECUs.

Here, when the diagnosis communication unit 82 receives a diagnosis data request from the vehicle diagnosis device 40, the priority level management unit 84 can detect that the vehicle diagnosis device 40 has been connected to the DLC 19. When, for example, the diagnosis communication unit 82 receives a diagnosis completion notification from the vehicle diagnosis device 40, the priority level management unit 84 can determine that the vehicle diagnosis device 40 has been disconnected from the DLC 19.

4. Processing Procedure in Vehicle Communication System

Next, a procedure of communication processing by the vehicle control ECU and the relay device in the control system 1 that is a vehicle communication system is described.

Figure 4:
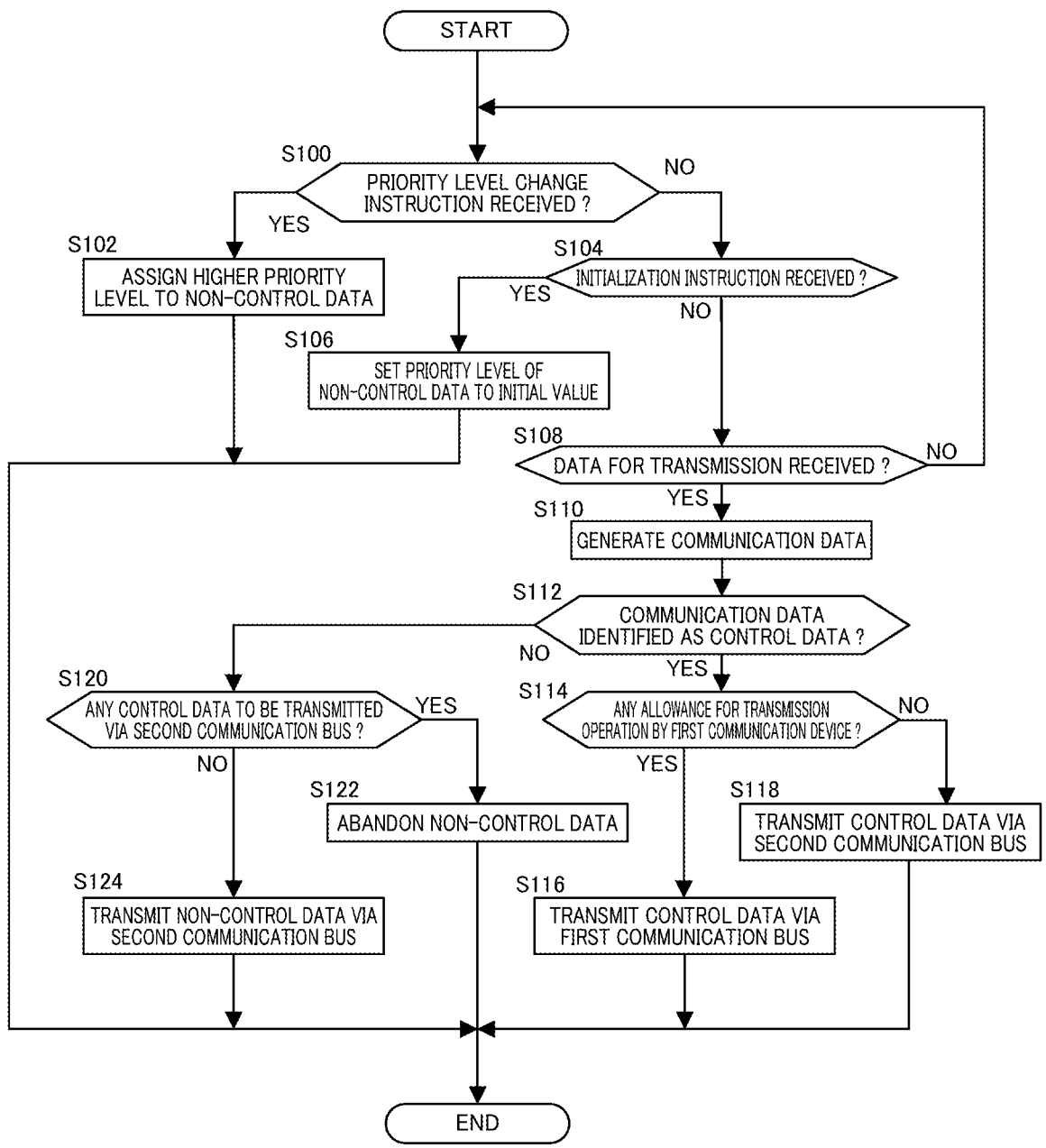
FIG. 4 is a flowchart showing a procedure of communication processing in the second zone ECU.

FIG. 4 is a flowchart showing a procedure of communication processing to be executed by the first communication management unit 60 in the second zone ECU 20b that is a vehicle control ECU. This processing is repetitively executed by the first communication management unit 60.

Upon start of the processing, the first communication management unit 60 determines whether a priority level change instruction transmitted from the central ECU 2 has been received or not (S100). Then, if the priority level change instruction has been received (YES in S100), the first communication management unit 60 assigns a higher priority level as the priority level of non-control data indicated on the first transmission code list 55 stored in the memory 51 (S102), and the processing then ends.

On the other hand, if the priority level change instruction has not been received in S100 (NO in S100), the first communication management unit 60 determines whether an initialization instruction transmitted from the central ECU 2 has been received or not (S104). Then, if the initialization instruction has been received (YES in S104), the first communication management unit 60 sets the priority level of non-control data indicated on the first transmission code list 55 stored in the memory 51 to a predetermined initial value (S106), and the processing then ends.

On the other hand, if the initialization instruction has not been received in S104 (NO in S104), the first communication management unit 60 determines whether data for transmission has been received from the control unit 57, the update unit 58, or the diagnosis unit 59 or not (S108). Then, if data for transmission has not been received (NO in S108), the first communication management unit 60 returns to step S100 and repeats the processing. On the other hand, if data for transmission has been received (YES in S108), the first communication management unit 60 generates communication data including the received data for transmission (S110).

Next, the first communication management unit 60 determines whether the generated communication data is control data or not (S112). Then, if the generated communication data is control data (YES in S112), the first communication management unit 60 determines whether there is an allowance for a transmission operation by the first communication device 52 or not (S114). Then, if there is an allowance for a transmission operation by the first communication device 52 (YES in S114), the first communication management unit 60 transmits control data that is the communication data by the first communication device 52 via the first communication bus 41b (S116), and the processing ends.

On the other hand, if there is no allowance for a transmission operation by the first communication device 52 in step S114 (NO in S114), the first communication management unit 60 transmits control data that is the communication data by the second communication device 53 via the second communication bus 42b (S118), and the processing ends.

Further, on the other hand, if the communication data generated in step S110 is not control data, that is, non-control data, in step S112 (NO in S112), the first communication management unit 60 determines whether there is control data to be transmitted via the second communication bus or not (S120). Then, if there is control data to be transmitted via the second communication bus 42b (YES in S120), the first communication management unit 60 abandons non-control data that is the generated communication data (S122), and the processing ends.

On the other hand, if there is no control data to be transmitted via the second communication bus 42b in step S120 (NO in S120), the first communication management unit 60 transmits non-control data that is the generated communication data by the second communication device 53 via the second communication bus 42b (S124), and the processing ends.

Figure 5:
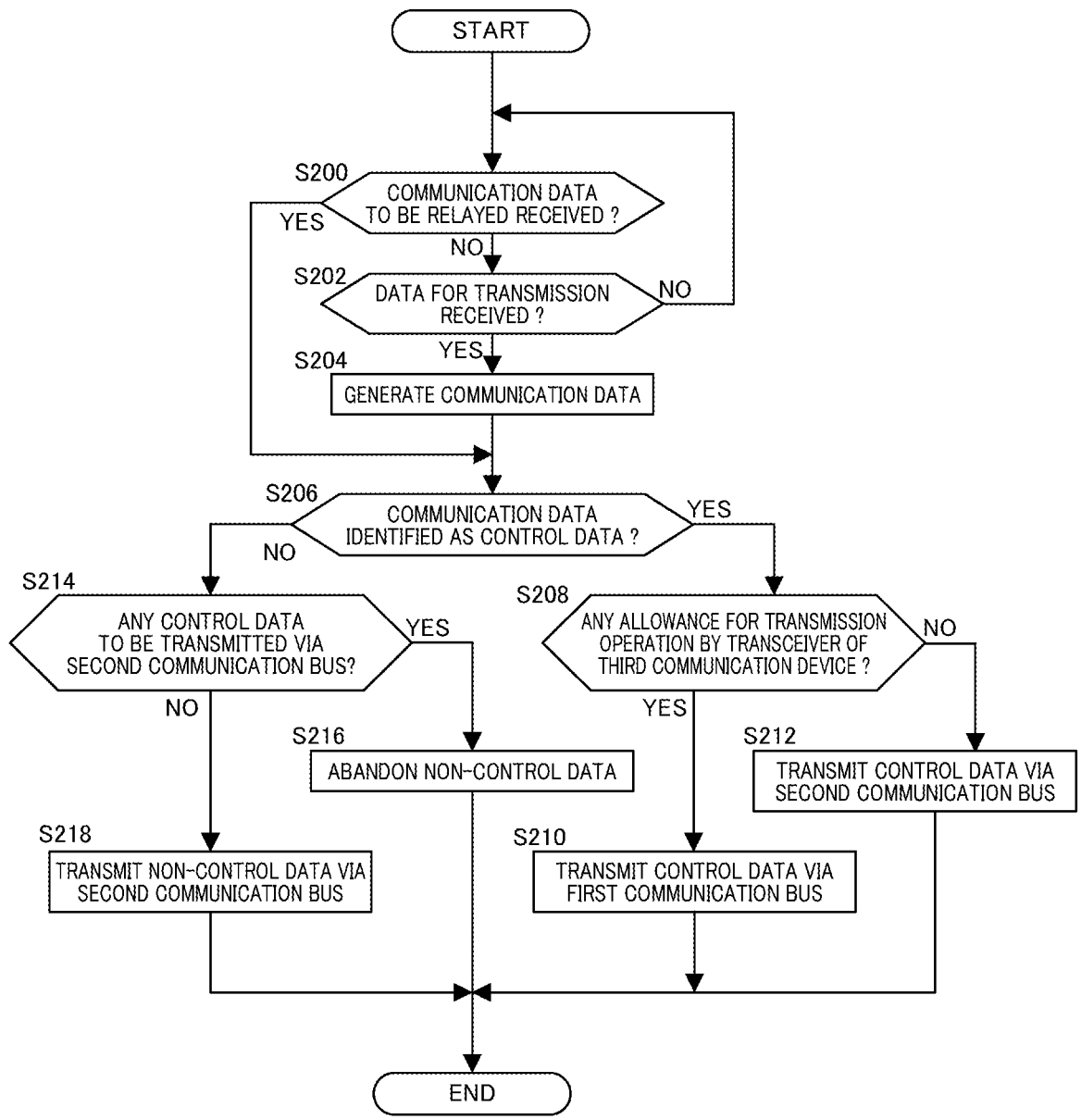
FIG. 5 is a flowchart showing a procedure of communication processing in the central ECU.

FIG. 5 is a flowchart showing a procedure of communication processing to be executed by the second communication management unit 83 in the central ECU 2 that is a relay device. This processing is repetitively executed by the second communication management unit 83.

Upon start of the processing, the second communication management unit 83 first determines whether communication data to be relayed from the relay unit 80 has been received or not (S200). Then, if communication data to be relayed has not been received (NO in S200), the second communication management unit 83 determines whether data for transmission has been received from the OTA management unit 81, the diagnosis communication unit 82, or the priority level management unit 84 or not (S202).

Then, if data for transmission has not been received (NO in S202), the second communication management unit 83 returns to step S200 and repeats the processing and awaits until communication data to be relayed is received or data for transmission is received.

On the other hand, if data for transmission has been received in step S202 (YES in S202), the second communication management unit 83 generates communication data including the received data for transmission (S204), and the second communication management unit 83 moves the processing to step S206.

Further, on the other hand, if communication data to be relayed has been received in step S200 (YES in S200), the second communication management unit 83 moves the processing to step S206.

In step S206, the second communication management unit 83 determines whether the communication data to be relayed or the generated communication data (hereinafter, transmission target communication data) is control data or not. Then, if transmission target communication data is control data (YES in S206), the second communication management unit 83 moves the processing to step S208.

Hereinafter, the processing from step S208 to step S210 is executed individually by handling each of the transceivers 721, 722 and 723 of the third communication device 72 as a processing target. Hereinafter, the transceiver 721, 722 or 723 that is a processing target is called "target transceiver of the third communication device 72".

In step S208, the second communication management unit 83 determines whether there is an allowance for a transmission operation by the target transceiver of the third communication device 72 or not. Then, if there is an allowance for a transmission operation by the target transceiver of the third communication device 72 (YES in S208), the second communication management unit 83 transmits control data being the transmission target communication data by the target transceiver of the third communication device 72 via the first communication bus 41b (S210), and the processing ends.

On the other hand, in step S208, if there is no allowance for a transmission operation by the target transceiver of the third communication device 72 (NO in S208), the second communication management unit 83 transmits control data being the transmission target communication data by the transceiver of the fourth communication device 73 corresponding to the target transceiver of the third communication device 72 via the second communication bus 42 (S212), and the processing ends. Here, the expression "the transceiver of the fourth communication device 73 corresponding to the target transceiver of the third communication device 72" refers to a transceiver of the fourth communication device 73 connected to the second communication bus 42 corresponding to the first communication bus 41 connected to the target transceiver of the third communication device 72. In other words, the transceivers of the fourth communication device 73 corresponding to the transceivers 721, 722 and 723 of the third communication device 72 are transceivers 731, 732 and 733, respectively.

On the other hand, if the transmission target communication data is not control data or is a non-control data device in step S206 (NO in S206), the second communication management unit 83 moves the processing to step S214.

Hereinafter, the processing from step S214 to step S218 is executed individually by handling each of the transceivers 731, 732 and 733 of the fourth communication device 73 as a processing target. Hereinafter, the transceiver 731, 732 or 733 that is a processing target is called "target transceiver of the fourth communication device 73".

In step S214, the second communication management unit 83 determines whether there is control data to be transmitted via the second communication bus 42 connected to the target transceiver of the fourth communication device 73 or not. Then, if there is control data to be transmitted via the second communication bus 42 connected to the target transceiver of the fourth communication device 73 (YES in S214), the second communication management unit 83 abandons non-control data that is the transmission target communication data (S216), and the processing ends.

On the other hand, if there is no control data to be transmitted via the second communication bus 42 connected to the target transceiver of the fourth communication device 73 in step S214 (NO in S214), non-control data that is the transmission target communication data is transmitted by the target transceiver of the fourth communication device 73 via the second communication bus 42 connected to the target transceiver (S218), and the processing ends.

It should be noted that, although it is configured such that communication data is generated after data for transmission is received in S108, S110 in FIG. 4 or S202, S204 in FIG. 5, embodiments of the present invention are not limited thereto. Configuring such that a communication data including data for transmission, a type code, an identification code, an ID and so on is transmitted allows omission of the step of generating.

Further, having described that non-control data is abandoned in S122 in FIG. 4 or in S216 in FIG. 5, embodiments of the present invention are not limited thereto. It may be configured such that non-control data is retained and that the non-control data is transmitted at a later time when the transmission is allowed.

5. Other Embodiments

It should be noted that the present invention is not limited to the configurations of the aforementioned embodiments and can be implemented in various aspects without departing from the spirit and scope of the present invention.

For example, having described that communication between the central ECU 2 being the relay device and the second zone ECU 20b or the like being the vehicle control ECU is compliant with the CAN communication standard in the aforementioned embodiments, the communication may be compliant with an arbitrary communication standard or communication method if a priority level can be defined for communication data. For example, the relay device and the vehicle control ECU may communicate over the Ethernet (registered trademark) or a USB.

Further, in the aforementioned embodiment, if there is no allowance for a transmission operation by the first communication device 52 connected to the first communication bus 41b, the first communication management unit 60 transmits control data by the second communication device 53 via the second communication bus 42b. Without limiting thereto, the first communication management unit 60 may perform redundant communication of control data via the first communication bus 41b and the second communication bus 42b. For example, for specific control data, the first communication management unit 60 may simultaneously transmit identical specific control data via the first communication bus 41 and the second communication bus 42 by using both of the first communication device 52 and the second communication device 53.

6. Configurations Supported by the Aforementioned Embodiments

The aforementioned embodiments support the following configurations.

(Configuration 1) A vehicle communication system including a relay device that relays data communication between a plurality of vehicle control ECUs mounted in a vehicle and two communication buses that connect between the relay device and each of the vehicle control ECUs, wherein the relay device and the vehicle control ECUs perform communication of control data relating to a control operation for the vehicle by using a first communication bus that is one of the two communication buses and perform communication of the control data and/or communication of non-control data excluding data relating to a control operation for the vehicle by using a second communication bus that is another one of the two communication buses.

According to the vehicle communication system of configuration 1, better communication of non-control data such as diagnosis data is provided, without providing a special communication line for transmitting the diagnosis data, and, at the same time, increases in the communication amounts and redundancy of control data communication required for control over vehicle operations can be attempted.

(Configuration 2) The vehicle communication system according to configuration 1, wherein data to be communicated between the relay device and the vehicle control ECUs is assigned a priority level, the relay device and the vehicle control ECUs communicate data to which a higher priority level is assigned in priority to other pieces of data, and the control data is assigned a higher priority level than that of the non-control data.

According to the vehicle communication system of configuration 2, a decrease of the communication speed of control data due to occurrence of non-control data can be prevented, and better responsibility of a vehicle control operation to be performed by a plurality of vehicle control ECUs in collaboration may be acquired.

(Configuration 3) The vehicle communication system according to configuration 2, wherein the relay device has a priority level management unit that manages assignment of a priority level to the non-control data, and while the vehicle stops, the priority level management unit assigns a higher priority level to the non-control data compared to a time when the vehicle is not stopped.

According to the vehicle communication system of configuration 3, during a period when the vehicle remains stopped and swiftness of vehicle control is not required, the communication speed of pieces of non-control data can be increased so that, for example, the update program for the vehicle control ECU can be quickly executed.

(Configuration 4) The vehicle communication system according to configuration 2 or 3, wherein the relay device has a priority level management unit that manages assignment of a priority level to the non-control data, and the non-control data includes diagnosis data to be communicated between a vehicle diagnosis device connected to the relay device externally to the vehicle and the vehicle control ECUs, and when the vehicle diagnosis device is connected to the relay device, the priority level management unit assigns a higher priority level to the non-control data compared to a time when the vehicle diagnosis device is not connected.

Since connecting the vehicle diagnosis device externally to the vehicle is limited to a time when the vehicle remains stopped, the swiftness of a diagnosis including communication of diagnosis data can be provided without affecting the swiftness of vehicle control while driving according to the vehicle communication system of configuration 4.

(Configuration 5) The vehicle communication system according to any one of configurations 1 to 4, wherein a communication band of communication via the second communication bus to be performed between the relay device and the vehicle control ECUs is narrower than a communication band of communication via the first communication bus.

According to the vehicle communication system of configuration 5, since the communication band of the second communication bus that is responsible for communication of non-control data which allows a lower communication speed than that for control data is reduced, the cost of the communication device using the second communication bus can be reduced without affecting traffic of communication data.

(Configuration 6) The vehicle communication system according to any one of configurations 1 to 5, wherein the relay device and the vehicle control ECUs includes a first communication management unit and a second communication management unit, respectively, that manage communication via the second communication bus, and the first communication management unit and second communication management unit perform communication of the non-control data via the second communication bus when there is not the control data to be transmitted via the second communication bus.

According to the vehicle communication system of configuration 6, a decrease of the communication speed of control data due to occurrence of non-control data in the second communication bus can be prevented, and better responsibility of a vehicle control operation to be performed by a plurality of vehicle control ECUs in collaboration may be acquired.

(Configuration 7) The vehicle communication system according to any one of configurations 1 to 6, wherein the relay device and the vehicle control ECUs includes a first communication management unit and a second communication management unit, respectively, that manage communication via the second communication bus, and the first communication management unit and second communication management unit do not perform communication of the non-control data via the second communication bus when there is the control data to be transmitted via the second communication bus.

According to the vehicle communication system of configuration 7, when a need arises for performing communication of control data while non-control data is being communicated on the second communication bus, the communication of the non-control data is suspended so that the communication speed of the control data can be kept high.

REFERENCE SIGNS LIST

1: control system, 2: central ECU, 3: first communication line, 4, 4a, 4b, 4c: second communication line, 19: DLC, 20: zone ECU, 20a: first zone ECU, 20b: second zone ECU, 20c: third zone ECU, 30, 30a, 30b, 30c, 30d, 30e, 30f, 30g, 30h, 30i: ECU, 40: vehicle diagnosis device, 41, 41a, 41b, 41c: first communication bus, 42, 42a, 42b, 42c: second communication bus, 50, 70: processor, 51, 71: memory, 52: first communication device, 53: second communication device, 54: control program, 55: first transmission code list, 56: first reception code list, 57: control unit, 58: update unit, 59: diagnosis unit, 60: first communication management unit, 72: third communication device, 73: fourth communication device, 74: fifth communication device, 75: relay control program, 76: ID list, 77: second transmission code list, 78: second reception code list, 80: relay unit, 81: OTA management unit, 82: diagnosis communication unit, 83: second communication management unit, 84: priority level management unit, 721, 722, 723, 731, 732, 733: transceiver

What is claimed is:

1. A vehicle communication system comprising:
a relay device that relays data communication between a plurality of vehicle control ECUs mounted in a vehicle; and
two communication buses that connect between the relay device and each of the vehicle control ECUs,
wherein the relay device and the vehicle control ECUs:
perform communication of control data relating to a control operation for the vehicle by using a first communication bus that is one of the two communication buses, and
perform communication of the control data and/or communication of non-control data excluding data relating to a control operation for the vehicle by using a second communication bus that is another one of the two communication buses, and
wherein data to be communicated between the relay device and the vehicle control ECUs is assigned a priority level,
the relay device and the vehicle control ECUs communicate data to which a higher priority level is assigned in priority to other pieces of data,
the control data is assigned a higher priority level than that of the non-control data, and
a communication band of communication via the second communication bus to be performed between the relay device and the vehicle control ECUs is narrower than a communication band of communication via the first communication bus;
wherein the relay device has a priority level management unit that manages assignment of the priority level to the non-control data, and
while the vehicle stops, the priority level management unit assigns a higher priority level to the non-control data compared to a time when the vehicle is not stopped.

2. The vehicle communication system according to claim 1, wherein
the non-control data includes diagnosis data to be communicated between a vehicle diagnosis device connected to the relay device externally to the vehicle and the vehicle control ECUs, and
when the vehicle diagnosis device is connected to the relay device, the priority level management unit assigns a higher priority level to the non-control data compared to a time when the vehicle diagnosis device is not connected.

3. The vehicle communication system according to claim 1, wherein
the relay device and the vehicle control ECUs includes a first communication management unit and a second communication management unit, respectively, that manage the communication via the second communication bus, and
the first communication management unit and second communication management unit perform the communication of the non-control data via the second communication bus when there is not the control data to be transmitted via the second communication bus.

4. The vehicle communication system according to claim 1, wherein
the relay device and the vehicle control ECUs includes a first communication management unit and a second communication management unit, respectively, that manage the communication via the second communication bus, and
the first communication management unit and second communication management unit do not perform the communication of the non-control data via the second communication bus when there is the control data to be transmitted via the second communication bus.

* * * * *